United States Patent [19]

Kettenbauer

[11] Patent Number: 5,024,598
[45] Date of Patent: Jun. 18, 1991

[54] PROCESS AND DEVICE SUITABLE FOR THERMALLY PROCESSING A MATERIAL COMPRISING THERMALLY DEGRADABLE AND THERMALLY-RESISTANT SUBSTANCES

[76] Inventor: Franz Kettenbauer, Römerweg 16, D-7886 Murg/Baden, Fed. Rep. of Germany

[21] Appl. No.: 285,512

[22] Filed: Dec. 16, 1988

[30] Foreign Application Priority Data

Jul. 20, 1988 [DE] Fed. Rep. of Germany ....... 3824615

[51] Int. Cl.⁵ .............................................. F27B 9/28
[52] U.S. Cl. ......................................... 432/59; 432/8; 432/148; 432/152
[58] Field of Search ...................... 432/8, 59, 148, 152

[56] References Cited

U.S. PATENT DOCUMENTS

| 4,116,620 | 9/1978 | Stibbe ..................................... 432/59 |
| 4,529,379 | 7/1985 | DiCastri ............................... 432/59 |
| 4,639,405 | 1/1987 | Franke .................................. 432/59 |
| 4,767,321 | 8/1988 | Chilva ..................................... 432/8 |
| 4,790,749 | 12/1988 | Mauro ................................... 432/59 |
| 4,792,302 | 12/1988 | Baker et al. ......................... 432/59 |

FOREIGN PATENT DOCUMENTS

1247532 2/1968 Fed. Rep. of Germany .
3524902 1/1987 Fed. Rep. of Germany .
3543845 6/1987 Fed. Rep. of Germany .

Primary Examiner—Henry C. Yuen
Attorney, Agent, or Firm—Fish & Richardson

[57] ABSTRACT

The invention relates to a process suitable for thermally processing a material containing substances that can be degraded or altered by heat and substances that are heat resistant. The process involves predrying the material in a drying zone and a preheating zone and baking the material in a baking zone. The material is predried in the preheating zone in the presence of a minimal quantity of oxygen and in the baking zone in the presence of an increased quantity of oxygen. An indirect supply of hot gas is used for the baking step. A device for carrying out the process is also provided.

13 Claims, 5 Drawing Sheets

FIG. 7

PROCESS AND DEVICE SUITABLE FOR THERMALLY PROCESSING A MATERIAL COMPRISING THERMALLY DEGRADABLE AND THERMALLY-RESISTANT SUBSTANCES

The present invention relates to a process suitable for thermally processing a material containing both thermally degradable and thermally resistant substances as well as a device suitable for implementing the proposed process.

West German published patent application DE-OS 35 24 902 describes a process suitable for thermally treating mineral substances contaminated with organic compounds in order to decompose the contaminants by oxidation. The process involves heating and igniting the pre-crushed substances in a sintering belt furnace. The feedstock is, to this end, preheated in a preheating zone and then transferred to a combustion zone, where it is ignited by means of one or more burners. By this process, the organic constituents are incinerated and then subjected, in a baking zone, to a secondary thermal treatment by means of an auxiliary burner.

The feedstock, after cooling in a cooling zone located downstream of the baking zone, exits the sintering belt furnace as a mineral substance free of organic contaminants and can be recycled as raw material in the production of, for example, mineral fibres.

The stream of waste gases generated by the thermal combustion flows through a heat exchanger and is used to preheat the air supply prior to thermal combustion and/or as preheating air. The waste gas is subsequently filtered to prevent the release of impurities into the environment.

The feedstock is conveyed upon an endlessly-rotating sintering belt inside an essentially closed sintering belt furnace, such belt being composed of a high-temperature resistant, woven, air-pervious mesh.

The basic advantages separating a sintering belt furnace from a conventional rotary cylindrical kiln are that thermal processing can be carried out in a completely gas-tight system and that the furnace can be shut down for short intervals and then restarted without occasioning downtime.

Burners arranged underneath the sintering belt serve to preheat the feedstock or provoke thermal post-combustion by directing hot gases from below to the sintering belt or to the feedstock being conveyed thereupon.

The burners comprise a combustion chamber aligned transversely to the longitudinal direction of the sintering belt and extending essentially over the entire width of such sintering belt, and a burner chamber nozzle that propels hot air from the combustion chamber across the entire width of the sintering belt. Although the combustion chamber in the known system features a conical shape permitting it to distribute, to the greatest degree possible, equal quantities of heated air over the entire width of the sintering belt, the material above the combustion chamber confined to the combustion zone is burned by the hot gases blowing directly onto the sintering belt or, rather the feedstock being moved on top of it, while the material located at the ends of the combustion chamber is heated or baked to a considerably lesser degree. This arrangement produces an insufficient thermal treatment which is incapable of removing all of the organic impurities present in the raw material.

Another disadvantage of the known process or known device is that, since a few small sections of the feedstock are directly exposed to heating or burning, it is generally impossible to regulate the thermal treatment process.

The present invention aims to provide a process and a system suitable for thermal secondary treatment which, while guaranteeing the structural integrity of the thermally resistant substances undergoing thermal processing, enables precise temperature-control throughout the entire thermal treatment process to be achieved.

According to one aspect of the invention there is provided a process suitable for thermally processing a material containing thermally-degradable or alterable and thermally-resistant substances which comprises: predrying said material in a drying and preheating zone and baking said material in a baking zone, wherein said material is predried in the predrying zone in the presence of a minimal quantity of oxygen and baked in the baking zone in the presence of an increased quantity of oxygen and an indirect hot gas supply.

According to another aspect of the invention there is provided a device for thermally processing a material containing thermally degradable or alterable and thermally resistant materials, which comprises: a closed furnace chamber internally encompassing at least a preheating zone and a baking zone; an endless sintering belt within said chamber passing through said zones; a feed device for feeding unprocessed material into said furnace chamber and onto said belt; a removal device for conveying processed material from said furnace chamber; a waste gas line for conveying waste gas from said furnace chamber; and a plurality of burners disposed below and along the length of said sintering belt; said burners comprising a combustion chamber and one or more burner nozzles extending transversely of the sintering belt, at least one of said nozzles being oriented at an acute angle to said sintering belt.

The proposed system, by utilizing the advantages of a sintering belt furnace not found in a conventional rotary cylindrical kiln, permits both the accomplishment of a treatment procedure in a completely gastight environment and the shutting-off and restarting of the furnace without occasioning downtimes. The proposed system offers, in addition to the known sintering belt furnace, the advantage of a non-destructive recovery of high-quality, thermally-resistant substances as well as precise temperature control of the entire thermal process. The process can, in consequence, be adapted to thermally process specific impurity-containing thermally resistant substances in order to allow various thermally-resistant substances to be recycled.

An advantageous alternative version of the proposed process is characterized by the employment of a mesh sintering belt serving to convey the material through the different stages in concert with burner nozzles which, being oriented at an acute angle to the sintering belt, are capable of directing hot gases from below through the sintering belt to the baking zone in such a way that the hot gases cannot blow directly onto such material. Thus, while the high-grade heat-resistant raw material is not burned across any part of the width of the sintering belt, the thermally-degradable impurities are entirely eliminated.

In another advantageous embodiment of the proposed process, the preheating zone, the heating zone and the baking zone are arranged one above the other, whereby the burners expelling the hot gases are arranged essentially in the baking zone situated beneath the heating zone. This version of the proposed process ensures continuous heating of the material undergoing treatment, whereby, since the oxygen content increases from the preheating zone to the baking zone, the material is prevented from igniting at the preheating stage.

In another advantageous embodiment of the proposed system, the disposition of a plurality of burners along the length of the heating and baking zones permit the controlled, continuous heating of the process materials, and foster conditions propitious for the thermal processing of materials of different compositions.

As noted above, a preferred device suitable for implementing the proposed process is characterized by a sintering belt that runs endlessly and essentially horizontally inside a closed furnace casing, by a device to supply thermally unprocessed material and a device to deliver the thermally processed material, a waste gas line, and a plurality of burners distributed along the length of and underneath the sintering belt together with a combustion chamber and one or more burner nozzles that extend across the width of such sintering belt, whereby at least one burner nozzle is oriented at an acute angle to the sintering belt. Thus ensured are the heating of the material over the full width of the sintering belt without any burning, while offering the singular advantage of a sintering belt process capable of operating in a closed system that can be shut down and restarted at short intervals.

Preferred embodiments of the present invention are described in detail below with reference to the accompanying drawings, in which.

Figure 1:
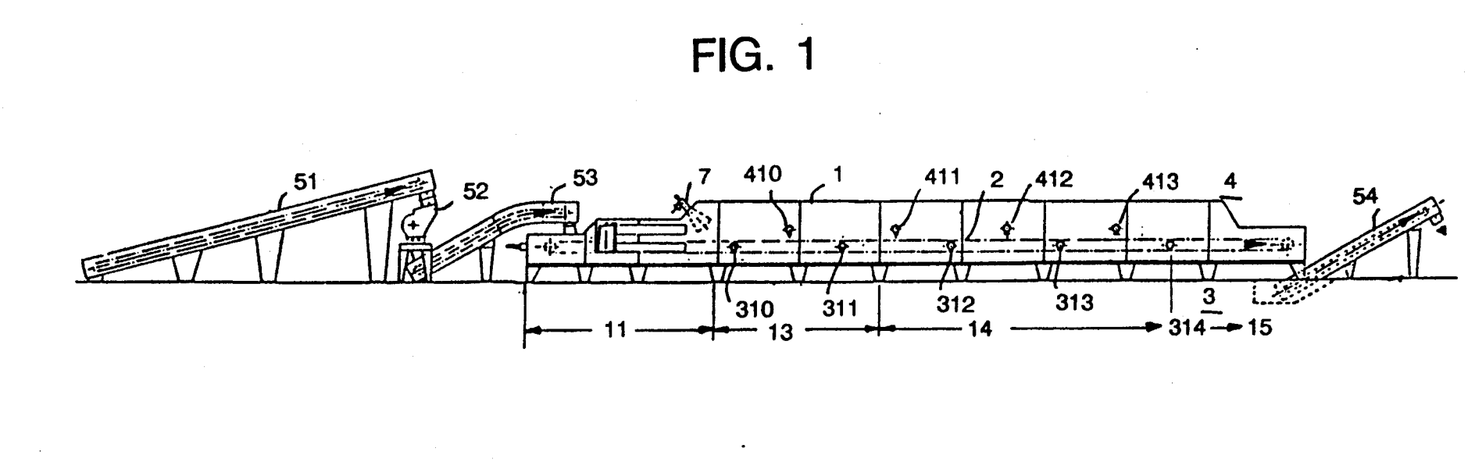
FIG. 1 is a longitudinal section through a sintering belt apparatus employing a sintering belt.

The longitudinal section shown in FIG. 1 of a sintering belt apparatus having a sintering belt shows a feed device 51 that conveys the feedstock to a crushing device 52, where it is, for example, cut to pieces by cutting knives. After crushing, the material is conveyed by means of another feed device 53 into the sintering belt furnace 1 and onto the sintering belt 2.

In a first zone, which is the drying zone 11, the still slightly moist material is dried and conveyed to a second zone, or heating zone 13, wherein it is heated up by means of a heating zone burner 7 placed at the entrance of heating zone 13 above sintering belt 2 and oriented at an acute angle to sintering belt 2. Additional burners 310, 410 and 311, which are arranged in a staggered manner, heat the material to a maximum temperature of 450° to 500° C.

The material is borne directly by sintering belt 2 from heating zone 13 to baking zone 14, where burners 312, 313, 314 placed beneath sintering belt 2, further heat the material, while the burners 411, 412, 413, arranged above sintering belt 2, ignite the material.

In a cooling zone 15 arranged downstream, the heated material, which comprises at this stage only thermally resistant substances, is cooled-down while thermally degraded and altered substances are removed. Additionally, cooling air can be supplied if required.

At the end of sintering belt furnace 1, the material comprising a thermally-resistant raw material can be conveyed through a sluice onto a conveying device 54, for transfer to further processing steps.

As FIG. 1 illustrates, the burners 3 placed beneath sintering belt 2 as well as burners 4 placed above sintering belt 2 are distributed in a staggered manner along the entire length of sintering belt 2 and therefore facilitate optimal temperature control along the entire length of such sintering belt 2, an arrangement that obviates overheating of the material and the attendant burning of the recovered raw material. Raw materials of different composition can be simultaneously freed of impurities without modifications being made to the sintering belt system.

As will later be shown, the burners 4 placed above the sintering belt 2 have a different configuration from that of the burners 3 placed below sintering belt 2, an arrangement that ensures both that hot gases introduced from below sintering belt 2 cannot burn the material on top of the sintering belt 2 and that no cold zones develop.

Figure 2:
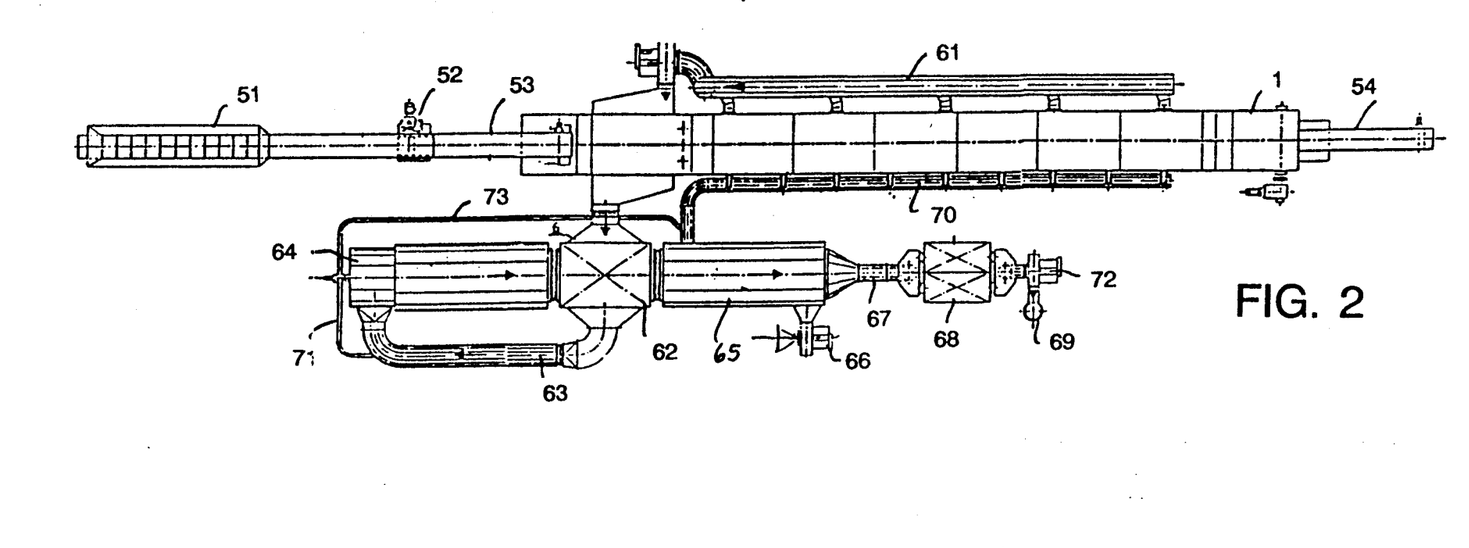
FIG. 2 is a plan view of the sintering belt apparatus in accordance with FIG. 1.

FIG. 2 is a plan view of the proposed sintering belt apparatus in accordance with FIG. 1, comprising the arrangement of the feed devices and conveying devices 51, 53, 54 as well as the crushing device 52 and sintering belt 2 located inside sintering belt furnace 1.

Waste gas lines originate at fixed distances from the region of the baking zone 14 as well as the heating zone 13 of sintering belt furnace 1 and flow into a waste gas collector line 61. Waste gases flow from the latter at a temperature of approx. 200° C. to a waste gas heat exchanger 62, where the waste gases are heated to about 400° to 500° C. and then conducted through a connecting line 63 to a thermal post-combustion chamber 64. The waste gases are subjected, in the thermal post-combustion chamber 64, to post-combustion and then flow through a waste gas heat exchanger 62 to a fresh air heat exchanger 65 at a temperature of approx. 600° C. to 700° C.. In thermal post-combustion chamber 64, the waste gases are freed of organic, mainly gaseous components.

The fresh air supplied to the fresh air-heat exchanger 65 through a blower 66 passes through the fresh air heat exchanger in a counter-stream process and feeds via a burner-air line 70 combustion air preheated to about 350° C. to the individual burners 3, 4.

The waste gases exit the fresh air heat exchanger 65 at a temperature of 160° C. to 180° C. and are discharged through an exhaust line 67 and a filtering device 68, in which exhaust gas is mechanically purified and filtered particles can be reused immediately as raw material, by means of a blower 72 and a chimney 69.

For the purpose of thermal post-combustion, the combustion air is conducted through by pass lines 71, 73 from the connecting line 63 and the burner-air line 70 to the thermal post-combustion chamber 64.

As FIGS. 1 and 2 indicate, the sintering belt plant is enclosed to the largest extent possible in order to prevent ecologically harmful substances and gases from polluting the atmosphere. The proposed sintering belt plant furthermore operates economically, due to the extensive recovery of the energy required for the thermal processing of materials. Such an arrangement is in addition to being economical, ecologically benign.

In accordance with FIGS. 1 and 2, the purified, reusable, thermally-resistant substances as well as decomposition products resulting from thermal post-combustion, which essentially comprise carbon dioxide and steam, are released from the sintering belt plant. The thermally-resistant materials, having been freed of organic substances, can be reused as raw materials for production purposes, which precludes additional storage and dumping costs and needless ecological damage.

Figure 3:
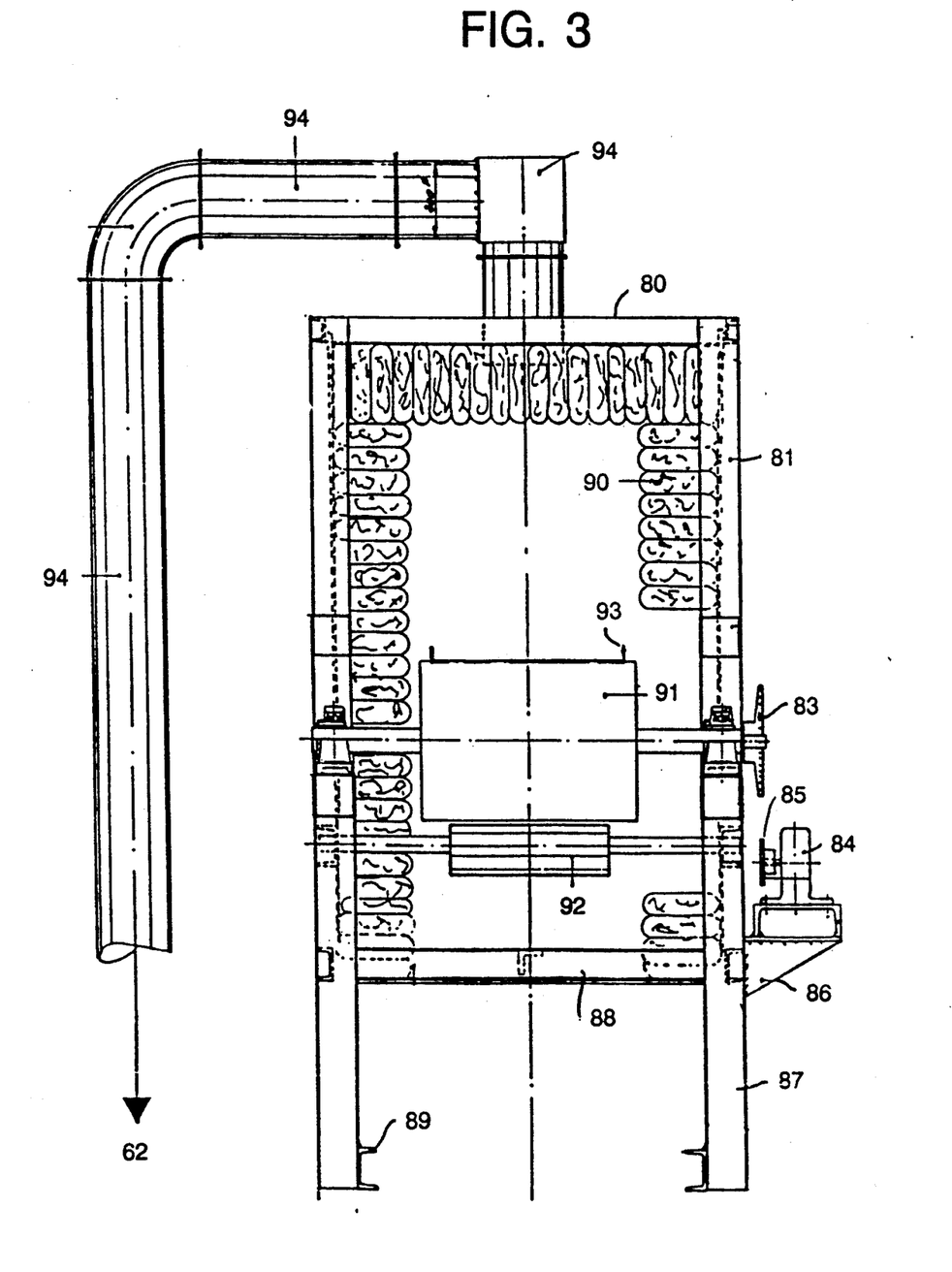
FIG. 3 is a cross section through a sintering belt furnace.

FIG. 3 shows a cross section of the sintering belt plant in accordance with FIG. 1 in the region of the drive and illustrates the internal construction of the sintering belt furnace 1.

The furnace features lateral walls 81 which, together with a top plating 80 and a floor plating 88, constitute the closed furnace chamber. In order to prevent heat radiation loss, the internal furnace wall is provided with a heat-resistant insulation 90, which can, for example, be a ceramic fibre mat.

The drive system of the sintering belt comprises a drive motor 84 arranged on a driving console 86, such driving motor driving a sprocket-wheel 85 and through it an additional sprocket-wheel 83, which is connected through a shaft to a driving drum 91 situated inside the sintering belt furnace. Driving drum 91 has a toothed meshing band 93, which meshes with the sintering belt. Driving drum 91 is supported by bearing rollers 92.

The sintering belt furnace rests on supports 87, which feature at their lower ends additional securing rails 89 for securing the plant. A waste gas line 94 conducts the waste gases produced by the combustion process to the thermal post-combustion section shown in FIG. 2.

Figure 4:
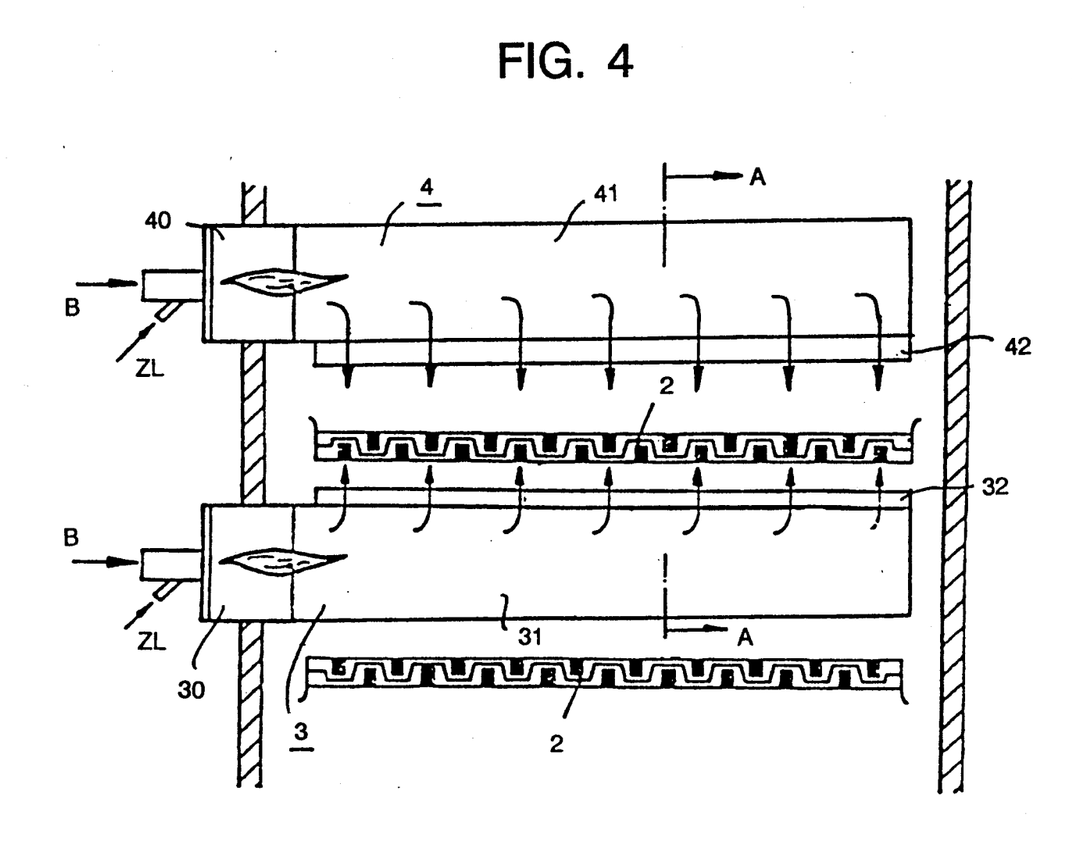
FIG. 4 is a cross section of the combustion chamber of a sintering belt plant in accordance with FIG. 1.

FIG. 4 shows a cross section of the combustion chamber wherein burners 3 and 4 are arranged above and below sintering belt 2.

Burners 3, 4 are supplied through separate supply lines with fuel B and, in accordance with FIG. 2, with preheated air supply ZL and furthermore a combustion zone 30, 40, a combustion chamber 31, 41 as well as burner nozzles 32, 42. As FIG. 4 shows, bottom burner 3 is arranged beneath sintering belt 2 or alternatively, due to the implementation of the sintering belt 2 as a endless conveyer belt, between the belt carrying the material and the return belt. The distance of the bottom burner 3 from the sintering belt is shorter than that of burner 4 to the sintering belt.

Figure 5:
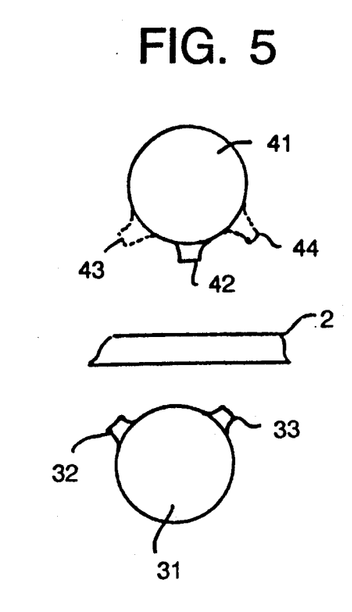
FIG. 5 is a section through the combustion chamber in accordance with FIG. 4 along the line A—A.

FIG. 5 shows, in a section along the line A—A through the combustion chamber of FIG. 4, the configuration of the combustion chambers and burner nozzles of the top and bottom burners.

In order to prevent hot gases issuing from below from coming in direct contact with the material carried by sintering belt 2, burner nozzles 32, 33 of bottom burner 3 are staggered laterally in relation to the medial longitudinal axis of combustion chamber 31, in order for hot gases propelled from burner nozzles 32, 33 to strike the sintering belt at an acute angle. In contrast, the burner nozzle 42 of top burner 4 is placed in the medial longitudinal axis of combustion chamber 41, so as to ensure that the hot gases propelled from the top burner strike the sintering belt at right angles.

Alternatively, burner 4 can have additional burner nozzles 43, 44, which, analogously to the burner nozzles 32, 33 of burner 3, are displaced laterally in relation to the medial longitudinal axis so that, in addition, the hot gases propelled from the top burner 4 also strike the material on top of the sintering belt 2 at an acute angle.

The special arrangement of the burner nozzles prevents the hot gases issuing from bottom burner 3, which lies closer to the sintering belt than top burner 4, from striking too forcefully on the process material, and damaging the thermally-resistant substances that are intended for reuse.

Figure 6:
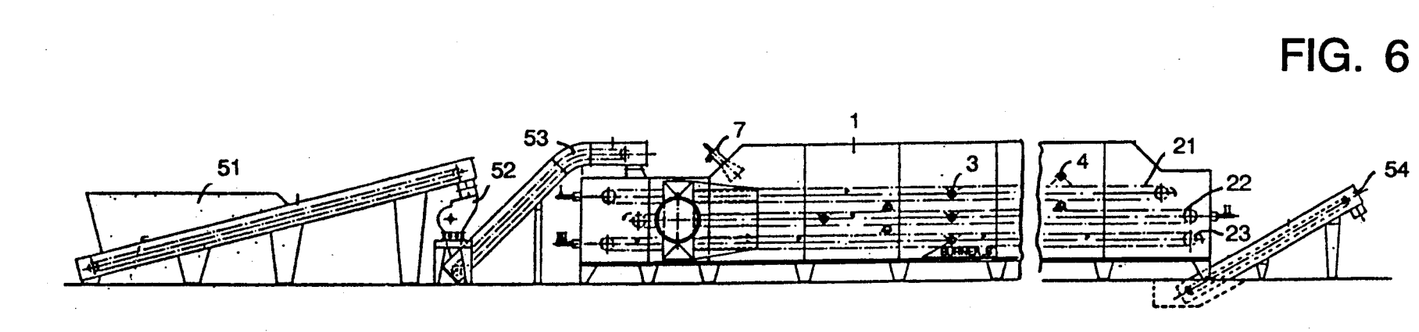
FIG. 6 is a longitudinal section through a sintering belt plant having three belts arranged one above the other.
Figure 7:
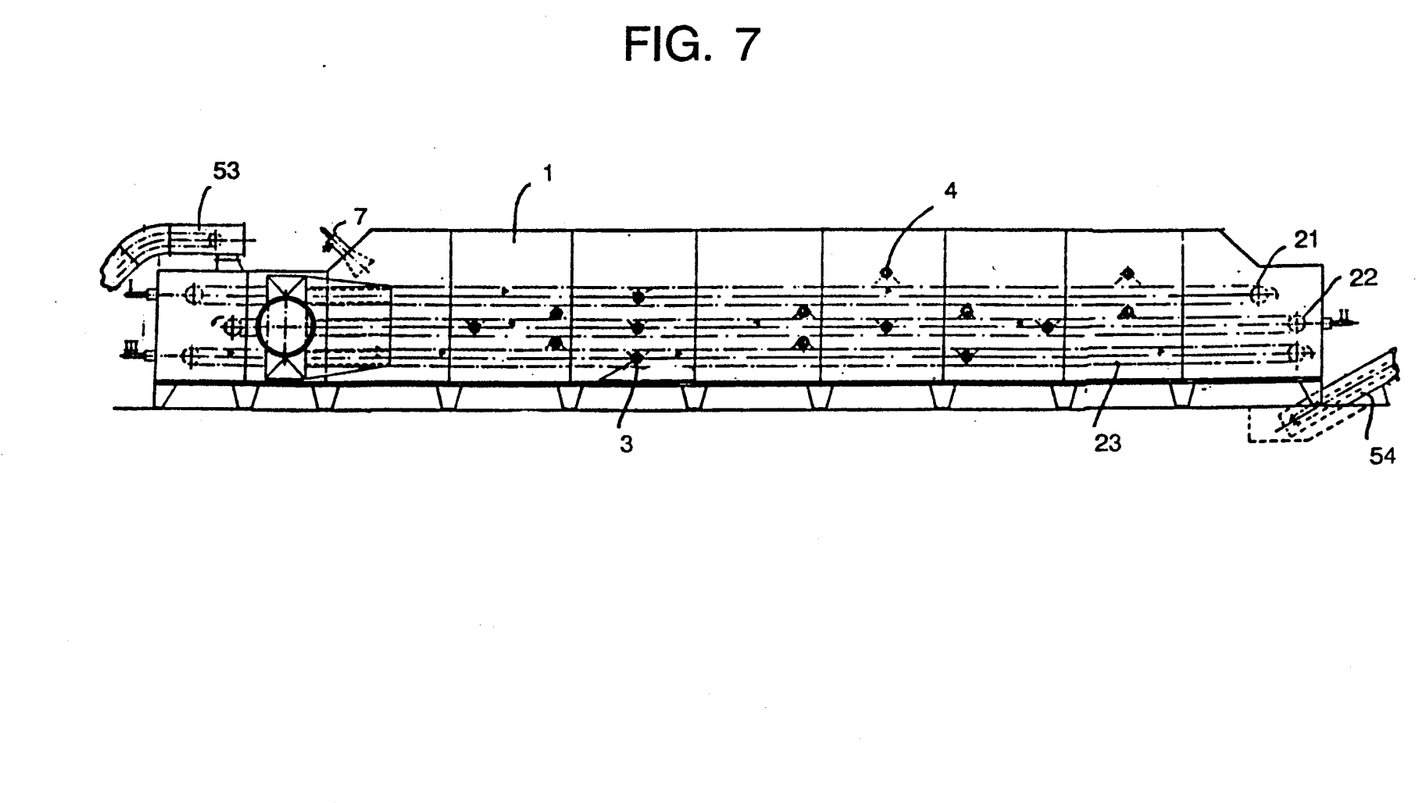
FIG. 7 is a longitudinal section through the sintering belt apparatus in accordance with FIG. 6.

FIG. 6 shows a longitudinal section through a sintering belt apparatus having three sintering belts arranged one above the other, while FIG. 7 is an isolated view of the sintering belt furnace in longitudinal section. Since parts of the plant corresponding to those in FIG. 1 have the same reference numbers, a description of such parts featured in FIG. 1 can be dispensed with.

FIG. 2 corresponds to the plan view of the apparatus in accordance with FIG. 6 and so a further plan view is not presented.

Figure 8:
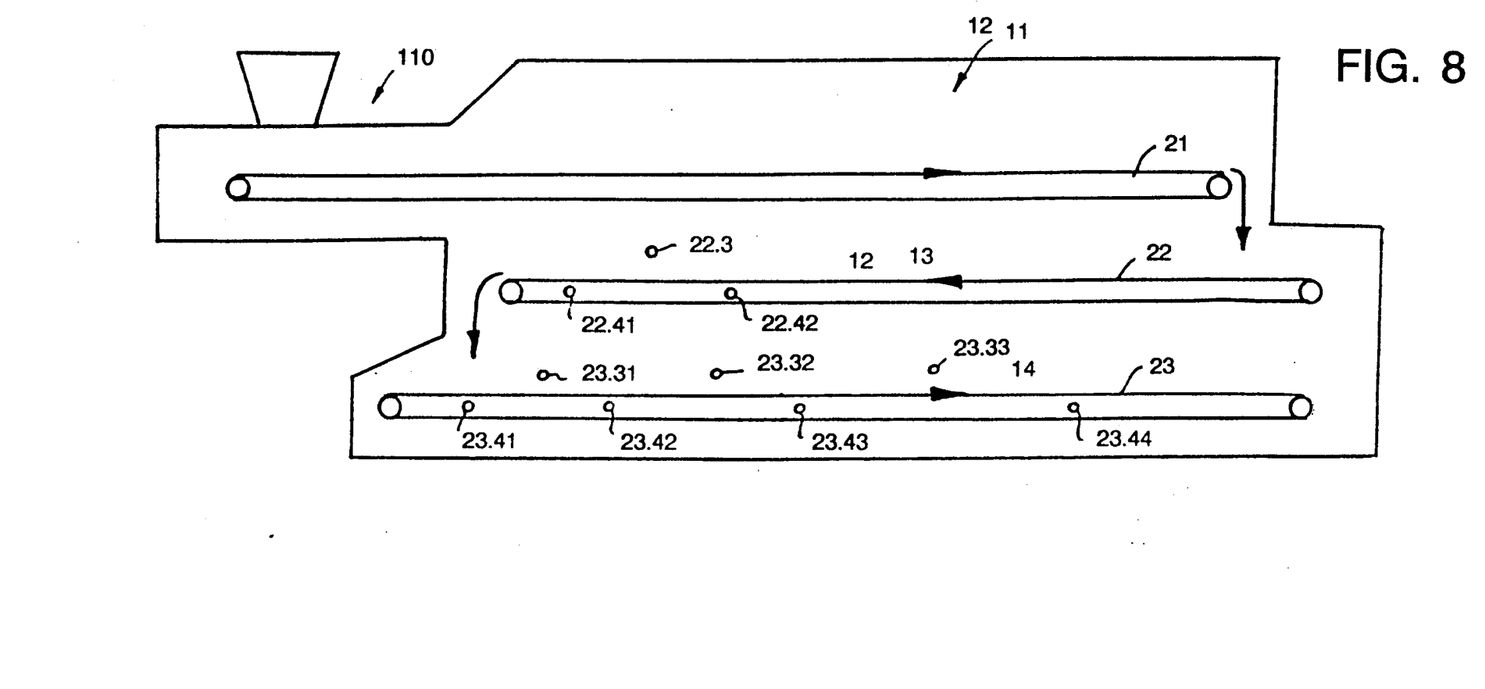
FIG. 8 is an enlarged, schematic diagram of the sintering belts in accordance with FIG. 7.

The sintering belt plant depicted in FIGS. 6, 7 and 8 has three sintering belts 21, 22, 23 arranged one on top of the other, along each of which is arranged a different number of burners. The topmost sintering belt 21 receives at the entrance point the crushed material from feed device 53 and conveys such material through 9 drying zone 10 and a preheating zone 12. At the end of sintering belt 21, the material conveyed by sintering belt 21 falls onto a middle sintering belt 22, whose guide roller is staggered relative to the guide roller of top sintering belt 21, so as to provide a sufficiently large catching surface to receive material from preheating zone 12.

Middle sintering belt 22 conveys the preheated material against the moving direction of sintering belt 21 up to the end of heating zone 13, where it falls onto a bottom sintering belt 23, whose guide roller is also staggered relative to the guide roller of middle sintering belt 22, in order to create a catching surface large enough to catch material from heating zone 13.

Bottom sintering belt 23 conveys the material again against the moving direction of middle sintering belt 22 and thereby in the same direction as the top sintering belt 21, through a baking zone 14 and if required through a cooling zone.

Several burners 23.41 to 23.44; 23.31 to 23.33 are arranged below and above bottom sintering belt 23, whereby burner configuration and burner arrangement correspond to the configuration and arrangement in accordance with FIG. 1.

Arranged in the region of the middle sintering belt 22 at the end of heating zone 13 are three auxiliary burners 22.41, 22.42 and 22.3 which are arranged below or above such middle sintering belt 22 and are used to provide additional heat to the material prior to transfer to the baking zone.

The arrangement of the three sintering belts 21, 22, 23 one above the other, as schematically presented in FIG. 8, and the installation of the burners in the region of the bottom sintering belt 23, ensures that the hot gases propelled from the burners directly heat or bake the material and that the rising gases heat the preheating zone, in which the process material is preheated to a maximum temperature of 350° C.. This arrangement provides for a decrease of oxygen content from bottom sintering belt 23 to top sintering belt 21, an arrangement that prevents the material from igniting in the region of preheating zone 12.

The arrangement of the region of drying zone 11 is such that rising gases do not directly enter this region, but serve merely to dry the feedstock.

This system facilitates the controlled continuous heating of the material together with increasing oxygen content from the drying zone 11 to the baking zone 14, whereby the burners distributed in the region of heating zone 13 and baking zone 14 permit the precise temperature control required for the optimal thermal processing of the material. Consequently, the high-quality recyclable raw material is not destroyed and is completely freed from substances that can be degraded or altered by heat.

The proposed sintering belt plant comprises a fully gas-tight, enclosed system, which prevents noxious gases or substances from being released into the environment and ensures that the plant can be shut down and restarted for short periods of time, which has great advantage over the known rotary cylindrical kiln.

In an alternate version of the proposed system, the sintering belt plant can be adapted for indirect heating, for example, with infrared radiators, so that the process material can be carbonized at low temperatures exclusively in the absence of oxygen. The burners can, for this purpose, be removed from the sintering belt furnace and replaced by suitable infrared radiators.

The distribution of the burners above and below the sintering belt as well as the aiming of hot gases through suitable burner nozzles provides for uniform baking of the material under precise temperature control, so that different types of high-quality recycling material can be recycled to an optimal degree and used in further processes.

The present invention is not restricted to the preferred embodiment example described above. Rather, many variations are possible, which utilize the proposed system for fundamentally different purposes.

I claim:

1. A device for thermally processing a material containing thermally degradable or alterable and thermally resistant materials to provide a mineral substance essentially free of organic contaminants, comprising:

a closed furnace chamber internally encompassing at least a preheating zone and a baking zone;

endless sintering belt structure within said chamber passing through said zones;

a feed device for feeding unprocessed material into said furnace chamber and onto said belt structure;

said sintering belt structure transferring said material through said preheating zone for predrying said material in the presence of a reduced quantity of oxygen and thereinafter through said baking zone wherein said material is baked in the presence of an increased quantity of oxygen and an indirect hot gas supply;

a removal device for conveying processed material from said furnace chamber;

a waste gas line for conveying waste gas from said furnace chamber;

a plurality of bottom burners disposed below and along the length of said sintering belt structure;

and a plurality of top burners arranged above said sintering belt structure;

each said bottom burner comprising a combustion chamber and one or more burner nozzles;

each said bottom burner in said baking zone comprising at least two burner nozzles protruding from said combustion chamber, said bottom burner nozzles being directed at an acute angle to said sintering belt structure for indirectly heating said material from below said sintering belt structure so as to ensure that hot gases are not expelled from said bottom burner directly onto material on said sintering belt structure;

each said top burner being adapted to direct an additional stream of hot gases directly onto said material on the sintering belt structure in the baking zone and comprising a combustion chamber and a burner nozzle extending from said combustion chamber in orientation perpendicularly to said sintering belt structure, said top burner nozzles being located further from material on said sintering belt structure than said bottom burner nozzles supplying the hot gases from below said sintering belt structure.

2. A device in accordance with claim 1, wherein two burner nozzles protruding from said combustion chamber are directed at an acute angle to said sintering conveyor belt.

3. A device in accordance with claim 1, wherein additional burner nozzles extending from said top burner are directed at an acute angle towards said sintering belt.

4. A device in accordance with either claim 1 or 3, wherein a plurality of bottom burners and top burners are distributed along the length of sintering belt and arranged preferably in an alternating sequence.

5. A device in accordance with either claim 1 or 3 wherein an additional burner is situated at an entrance region of said preheating zone and oriented at an acute angle in relation to the longitudinal direction of said sintering belt.

6. A device in accordance with claim 1 wherein a heating zone is provided between said preheating zone and said baking zone, and wherein the amount of oxygen available decreases from said baking zone to said preheating zone.

7. A device in accordance with claim 6 wherein said material passes through a drying zone prior to entering said preheating zone.

8. A device in accordance with claim 6 wherein a plurality of bottom burners and to burners are distributed along the length of said sintering belt structure and arranged preferably in an alternating sequence.

9. A device in accordance with claim 8 wherein an additional burner is situated at an entrance region of said preheating zone and oriented at an acute angle in relation to the longitudinal direction of said sintering belt structure.

10. A device for thermally processing a material containing thermally degradable or alterable and thermally resistant materials, comprising:

a closed furnace chamber internally encompassing a drying zone, a preheating zone, a heating zone, and a baking zone;

sintering belt structure within said chamber passing through said zones; including several mesh sintering belts are arranged one on top of the other in said furnace chamber, a first and upper sintering belt travelling endlessly through said drying zone as well as said preheating zone, a second and intermediate sintering belt passes through said heating zone and a third and lower sintering belt travels endlessly through said baking zone, an end of each preceding sintering belt being displaced relative to a beginning of each succeeding sintering belt in such a way that the material from any of the upper sintering belts falls onto a lower sintering belt;

a feed device for feeding unprocessed material into said furnace chamber and onto said first belt;

said first sintering belt transferring said material through said preheating zone for predrying said material in the presence of a reduced quantity of oxygen said third sintering belt transferring said material through said baking zone wherein said material is baked in the presence of an increased quantity of oxygen;

a removal device for conveying processed material from said furnace chamber;

a waste gas line for conveying waste gas from said furnace chamber;

a plurality of burners disposed below and along the length of said sintering belt;

each said burner comprising a combustion chamber and at least two burner nozzles protruding from said combustion chamber and being directed at an acute angle to said sintering belt structure for indirectly heating said material from below said sintering belt structure so as to ensure that hot gases are not expelled directly onto material on said third sintering belt structure.

11. A device in accordance with claim 10 wherein a plurality of top and bottom burners are arranged in said baking zone, and said heating zone contains one top burner and two bottom burners offset relative to one another.

12. A device in accordance with claim 10 wherein said material passes through a cooling zone downstream of said baking zone.

13. A device for thermally processing a material containing thermally degradable or alterable and thermally resistant materials, comprising:

a closed furnace chamber internally encompassing a drying zone, a preheating zone, a heating zone, and a baking zone;

endless sintering belt structure within said chamber passing through said zones; including several mesh sintering belts are arranged one on top of the other in said furnace chamber, a first and upper sintering belt travelling endlessly through said drying zone as well as said preheating zone, a second sintering belt passing through said heating zone and a third and lower sintering belt travelling endlessly through said baking zone, an end of each preceding sintering belt being displaced relative to a beginning of each succeeding sintering belt in such a way that the material from any of the upper sintering belts falls onto a lower sintering belt;

a feed device for feeding unprocessed material into said furnace chamber and onto said first belt;

said first sintering belt transferring said material through said preheating zone for predrying said material in the presence of a reduced quantity of oxygen, said second sintering belt transferring said material through said heating zone, said third sintering belt transferring said material through said baking zone wherein said material is baked in the presence of quantity of oxygen greater than in said preheating zone;

a removal device for conveying processed material from said furnace chamber;

a waste gas line for conveying waste gas from said furnace chamber;

a plurality of burners disposed below and along the length of said third sintering belt;

each said burner comprising a combustion chamber and at least two burner nozzles protruding from said combustion chamber and being directed at an acute angle to said sintering belt structure for indirectly heating said material from below said sintering belt structure so as to ensure that hot gases are not expelled directly onto material on said sintering belt structure.

* * * * *